United States Patent
Braginsky et al.

(10) Patent No.: US 6,803,067 B2
(45) Date of Patent: Oct. 12, 2004

(54) METHOD OF PREPARING AND USING A SCOOPABLE DOUGH PRODUCT

(75) Inventors: Irina E. Braginsky, Eagan, MN (US); John Graves, St. Paul, MN (US); Randy Hasse, St. Michael, MN (US); Leola Henry, Brooklyn Park, MN (US); Jalayne Martin, Roseville, MN (US); Cara Yarusso, Eagan, MN (US)

(73) Assignee: General Mills, Inc., Minneapolis, MN (US)

( * ) Notice: Subject to any disclaimer, the term of this patent is extended or adjusted under 35 U.S.C. 154(b) by 141 days.

(21) Appl. No.: 10/317,741

(22) Filed: Dec. 12, 2002

(65) Prior Publication Data

US 2003/0138540 A1 Jul. 24, 2003

Related U.S. Application Data

(63) Continuation-in-part of application No. 10/224,545, filed on Aug. 19, 2002, and a continuation of application No. 09/898,773, filed on Jul. 2, 2001, now Pat. No. 6,436,458, which is a continuation of application No. 09/523,133, filed on Mar. 10, 2000, now abandoned.

(51) Int. Cl.$^7$ .......................... A21D 10/00; A21D 13/00
(52) U.S. Cl. ....................... 426/391; 426/393; 426/394; 426/496; 426/446; 426/512; 426/549
(58) Field of Search ................................ 426/391, 393, 426/394, 496, 446, 512, 549

(56) References Cited

U.S. PATENT DOCUMENTS

| | | |
|---|---|---|
| 3,649,304 A | 3/1972 | Fehr, Jr. et al. |
| 3,767,421 A | 10/1973 | Gulsad et al. |
| 3,879,563 A | 4/1975 | Tucker et al. |
| 4,022,917 A | 5/1977 | Selenke |
| 4,146,652 A | 3/1979 | Kahn et al. |
| 4,381,315 A | 4/1983 | Yong et al. |
| 4,456,625 A | 6/1984 | Durst |
| 4,504,510 A | 3/1985 | Aliberto et al. |
| 4,526,801 A | 7/1985 | Atwell |
| 4,624,856 A | 11/1986 | Vanderveer et al. |
| 4,792,456 A | 12/1988 | Katz et al. |
| 4,803,084 A | 2/1989 | Shine |
| 4,828,853 A | 5/1989 | Banks et al. |
| 4,911,939 A | 3/1990 | Lou et al. |
| 4,917,914 A | 4/1990 | Katz et al. |
| 4,961,937 A | 10/1990 | Rudel |
| 5,079,012 A | 1/1992 | Lengerich et al. |
| 5,405,636 A | 4/1995 | Gard et al. |
| 5,458,903 A | 10/1995 | Colson et al. |
| 5,466,476 A | 11/1995 | Finkel et al. |
| 5,773,068 A | 6/1998 | Heidolph et al. |
| 5,792,499 A | 8/1998 | Atwell |
| 5,855,945 A | 1/1999 | Laughlin et al. |
| 5,858,440 A | 1/1999 | Laughlin et al. |
| 6,165,524 A | 12/2000 | Narayanaswamy et al. |
| 6,391,366 B1 * | 5/2002 | Boldon ........................ 426/553 |
| 6,436,458 B2 * | 8/2002 | Kuechle et al. .............. 426/128 |
| 6,589,583 B1 * | 7/2003 | Hansen et al. ............... 426/551 |
| 6,602,529 B1 * | 8/2003 | Lonergan et al. ............ 426/128 |
| 6,660,311 B2 * | 12/2003 | Goedeken et al. ............. 426/27 |

FOREIGN PATENT DOCUMENTS

| | | |
|---|---|---|
| EP | 0145550 A2 | 6/1985 |
| EP | 0620974 A2 | 10/1994 |
| WO | WO 99/04640 | 2/1999 |

OTHER PUBLICATIONS

*Miss Marcile's Jalapeno Cheddar Drop Biscuits.*

* cited by examiner

Primary Examiner—N. Bhat
(74) Attorney, Agent, or Firm—Annette M. Frawley; John A. O'Toole; Douglas J. Taylor

(57) ABSTRACT

A scoopable dough can be used to prepare cut biscuits, drop biscuits, dumplings, flat bread, crackers, pizza dough, doughnuts, fritters, hushpuppies, muffins, pastry crusts, coffee cake, quick bread, scones, cobbler-type crust, and the like. A scoopable dough can be formed into various shapes and thereafter stored at temperatures suitable for freezing and at temperatures suitable for refrigeration that includes flour, water, a protein supplement, a shortening, a humectant, and a leavening system encapsulated, and the scoopable dough has desirable viscoelastic properties. The various shapes of the scoopable dough can be in the form of individual single-serve units of dough that can be placed in an oven and baked without an intermediate thawing or proofing step.

47 Claims, No Drawings

METHOD OF PREPARING AND USING A SCOOPABLE DOUGH PRODUCT

CROSS-REFERENCES TO RELATED APPLICATIONS

This application is a continuation-in-part of U.S. application Ser. No. 10/224,545 filed on Aug. 19, 2002, which is hereby incorporated by reference in its entirety.

U.S. application Ser. No. 10/224,545 filed on Aug. 19, 2002, is a continuation of U.S. application Ser. No. 09/898,773, filed Jul. 2, 2001, now U.S. Pat. No. 6,436,458 B2 issued on Aug. 20, 2002 entitled "SCOOPABLE DOUGH AND PRODUCTS RESULTING THEREFROM", which is hereby incorporated by reference is a continuation of U.S. Ser. No. 09/523,133 filed on Mar. 10, 2000 now abandoned.

FIELD OF THE INVENTION

The invention is generally directed to dough food products and to their methods of preparation. More specifically, the present invention relates to farinaceous doughs that can be stored at temperatures suitable for freezing and at temperatures suitable for refrigeration. More specifically, the invention is a scoopable dough that can be formed into various shapes and thereafter stored at temperatures suitable for freezing and at temperatures suitable for-refrigeration that includes flour, water, a protein supplement, a shortening, a humectant, and a leavening system encapsulated, and the scoopable dough has desirable viscoelastic properties. Additionally, the invention is a method of use of the scoopable dough wherein a frozen dough shape is produced that can be placed in an oven and baked without an intermediate thawing or proofing step.

BACKGROUND OF THE INVENTION

Ready-made doughs that are storage stable at freezing or refrigeration temperatures are desirable for commercial and home baking. They minimize a cook's preparation time and are easy to use. Examples of refrigerated doughs are known and include, for example, U.S. Pat. No. 4,526,801; U.S. Pat. No. 3,879,563; and U.S. Pat. No. 4,381,315. These refrigerated doughs are typically packaged and stored in a can. They are also typically limited to storage at refrigeration temperatures and cannot alternatively be stored at freezing temperatures.

Yet it can be desirable to have a dough that can be stored at both refrigeration and frozen temperatures. For example, a dough can be shipped frozen and stored frozen prior to use. Alternatively, a dough can be shipped frozen, stored frozen, and then refrigerated prior to use. Furthermore, a dough can be shipped refrigerated, stored frozen, and then placed in an oven and baked with out an intermediate thawing or proofing step.

To prepare a dough that can be refrigerated and frozen, the general problems that arise from refrigeration and freezing should be addressed. For example, doughs that are refrigerated or frozen can prepare products that are doughy or gummy in texture or that result in less than desirable leavening due to premature reaction of the leavening system. Refrigerated and frozen doughs can also have the problems of dough graying and susceptibility to microbial contamination.

Thus, it is desirable to develop a dough that can be stored at freezing and refrigeration temperatures and that can be placed in an oven directly from the freezer and the refrigerator and still provide desirable baked products under either circumstance. The dough can be packaged in consumer and foodservice quantities.

SUMMARY OF THE INVENTION

The present invention resides in part in methods of using doughs in frozen condition that would be or are scoopable at refrigerator temperatures by baking frozen shaped and formed dough pieces prepared therefrom to form finished baked goods without intervening dough thawing or proofing steps.

A dough of the invention is shelf stable without storage under a vacuum at freezing temperatures and refrigeration temperatures. The dough is shelf stable at freezing temperatures for between about two months and about nine months. Moreover, after thawing, the dough is shelf stable at refrigeration temperatures for between about one day and about seven days.

A scoopable dough of the invention has desirable viscoelastic properties. These properties can include dough consistency and torque profile. In one embodiment, the dough has a dough consistency of between about 300 B.U. (Brabender Units) and about 1,200 B.U. More preferably, a scoopable dough that is preformed into individual single-serve units prior to freezing has a dough consistency of 700 B.U. to about 1000 B.U. In another embodiment, the dough has a torque profile of about 0.3 N·cm to greater than about 3 N·cm.

A scoopable dough of the invention includes flour, a protein supplement, a shortening, a humectant, a leavening system, and water. The flour and water can be in a flour-to-water ratio of between about 2:1 and about 1:1.

A scoopable dough of the invention can include ingredients suitable for controlling darkening of the dough (i.e., dough graying) such as, for example, flour having low polyphenol oxidase activity, flour having a flour enrichment with all reduced iron, a binder of metal ions, an organic acid, and the like.

A scoopable dough of the invention can control free water by the use of a humectant, absent the use of a hemicellulose compound such as a xylan compound.

A scoopable dough of the invention can be packaged without deoxygenating and hermetically sealing the package.

A scoopable dough of the invention can be transferred to a depositor, extruded through a die, wire cut into single-serve units onto a sheet of plastic film, conveyed to a freezer, frozen, packaged for foodservice quantities, shipped to a foodservice customer. Thereafter, the scoopable dough can be placed directly from the freezer into the oven and baked without an intermediate thawing or proofing step. Alternatively, the scoopable dough can thereafter be refrigerated for about one day to about seven days and then baked.

A baked product can be prepared from a scoopable dough of the invention.

A baked product can be prepared from a frozen dough of the invention.

DETAILED DESCRIPTION OF THE INVENTION

The invention is directed to a method of use of a dough suitable for preparing a baked product having a crisp outer crust and a tender interior. A dough of the invention at refrigeration temperatures is typically scoopable. The term "scoopable" refers to a dough having a consistency between that of a cookie dough and a batter. That is, a scoopable dough of the invention is firm enough to retain its shape upon baking but thin enough to relax somewhat during baking to create, for example, a rough-textured appearance. A scoopable dough of the invention typically has desirable viscoelastic properties, for example, desirable dough consistency or desirable torque profile.

More particularly, a scoopable dough of the invention typically has a dough consistency from between about 300 B.U. and about 1200 B.U. (Brabender Units) within 10 minutes of mixing the dough. This property can be determined by making a Farinograph measurement. (See The Farinograph Handbook, Locken et al. (ed.), American Association of Cereal Chemists, Inc. (1972) for a general discussion of Farinographs.)

Preferably the dough consistency ranges from between about 400 B.U. and about 1,000 B.U. and more preferably between about 700 B.U. and about 1000 B.U. within 10 minutes of mixing the dough.

Similarly, a scoopable dough of the invention can have a torque profile of about 0.3 N·cm to greater than about 3 N·cm, preferably between about 0.6 N·cm and about 2.8 N·cm, and more preferably between about 0.9 N·cm and about 2.5 N·cm within 10 minutes of mixing the dough. This property can be determined by making a Haake measurement using a transducer head of 3 N·cm. A 3 N·cm transducer head will not allow a torque profile greater than 3 N·cm to be identified.

A scoopable dough of the invention is shelf stable without storage under a vacuum. "Without storage under a vacuum" refers to packaging or storing the scoopable dough of the invention in a container without deoxygenating and/or hermetically sealing the container. "Shelf stable" refers to the scoopable dough of the invention being suitable for storage at refrigeration and freezing temperatures without the dough breaking down by, for example, microbial contamination, failure of the leavening system, etc. and becoming unsuitable for consumption.

A scoopable dough of the invention can be stored frozen for up to about two months, preferably up to about four months, and more preferably up to about nine months. Temperatures suitable for freezing a scoopable dough of the invention include, for example, less than about 30° F. (−1° C.), preferably less than about 10° F. (−12° C.), and more preferably less than about −10° F. (−23° C.). After being frozen, a scoopable dough of the invention can be thawed at temperatures of between about 30° F. (−1° C.) and about ambient temperature, preferably between about 35° F. (1° C.) and about 45° F. (7° C.) and more preferably between about 38° F. (3° C.) and about 42° F. (5° C.).

After thawing, a scoopable dough of the invention can be refrigerated at temperatures of between about 30° F. (−1° C.) and about ambient temperature, preferably between about 35° F. (1° C.) and about 45° F. (7° C.) and more preferably between about 38° F. (3° C.) and about 42° F. (5° C.) until the dough begins to break down such as by, for example, the leavening system failing. The time period for refrigeration after thawing can be up to about seven days and preferably for between about one day and about four days. Preferably a scoopable dough of the invention can be refrigerated for up to about two days, more preferably up to about four days, and even more preferably up to about seven days.

A scoopable dough of the invention can be placed directly from the freezer into an oven or alternatively thawed to refrigeration temperatures and thereafter baked to prepare a variety of baked goods. A scoopable dough of the invention is typically useful for preparing a chemically-leavened wheat dough products. Baked products that can be prepared by a scoopable dough of the invention include, for example, cut biscuits, drop biscuits, dumplings, flat bread, crackers, pizza dough, doughnuts, fritters, hushpuppies, muffins, pastry crusts, coffee cake, quick bread, scones, cobbler-type crust, and the like. Preferably a baked product prepared by a scoopable dough of the invention includes drop biscuits, dumplings, and scones.

A scoopable dough of the invention includes flour, water, a protein supplement, a shortening, a humectant, and a leavening system.

The dough of the invention includes a grain constituent that contributes to the structure of the dough. Flour is a grain constituent that is frequently used in baked goods. Suitable flours include hard wheat flour, soft wheat flour, corn flour, high amylose flour, low amylose flour, and the like. Different grain constituents lend different texture, taste, and appearance to a baked good. For example, a baked product made from a dough with hard wheat flour will have a coarser texture than a baked product made from a dough with soft wheat flour because hard wheat flour contains higher amounts of gluten.

A scoopable dough of the invention preferably includes soft wheat flour with gluten supplementation or a combination of hard wheat flour and soft wheat flour. Preferably the ratio of soft wheat flour to hard wheat flour is between about 2.2:1 and about 4:1, more preferably between about 2.4:1 and about 3.8:1, and even more preferably between about 3:1 and about 3.6:1.

A scoopable dough of the invention can also include a flour with low polyphenol oxidase activity. This type of flour can be effective against a scoopable dough of the invention losing its natural color and beginning to darken.

A scoopable dough of the invention can include flour enrichments having iron that is substantially all reduced. This type of flour enrichment can be effective against a scoopable dough of the invention losing its natural color and beginning to darken.

A dough of the invention typically includes an amount of flour effective to provide structure to the scoopable dough. That is, a scoopable dough of the invention includes flour in an amount effective to provide desirable dough consistency. The amount of flour should not be so high that the dough becomes nonscoopable and should not be so low that the dough is too thin to retain its shape. A dough of the invention can include flour in an amount of between about 30 weight percent and about 51 weight percent, preferably between about 22 weight percent and about 48 weight percent, and more preferably between about 36 weight percent and about 45 weight percent.

These flour amounts are based on flour having about 9 weight percent to about 11 weight percent moisture, about 8 weight percent to about 15 weight percent wheat protein, and about 0.4 to about 0.6 weight percent ash. One skilled in the art having read the specification would understand that flour amounts suitable for use with a scoopable dough of the invention can vary depending on the characteristics of flour used.

"Weight percent" as used herein is based on the total weight of the composition unless indicated to the contrary.

A scoopable dough of the invention also includes water. The amount of water should be effective to provide a desirable dough consistency suitable for a scoopable dough. The amount of water should not be so high that the scoopable dough cannot retain its shape and should not be so low that the dough is nonscoopable. Typically a dough of the invention includes flour and water in a flour-to-water ratio in a range of between about 2:1 and about 1:1, preferably between about 1.9:1 and about 1.2:1, and more preferably between about 1.8:1 and about 1.4:1.

A scoopable dough of the invention includes a protein supplement to provide structure to the dough. A protein supplement can contribute to a baked product prepared from a dough of the invention having a crisp, brown outer surface as well as a tender interior that is moist but not doughy. Protein supplements that provide these characteristics can generally be used. A suitable protein supplement can include proteins resulting from amino acids such as, for example, glycine, alanine, leucine, isoleucine, valine, phentolamine, turicine, typtophan, proline, methionine, cystine, serine, threonine, asparagines, glutamine, histidine, aspartic acid, glutamic acid, lysine, and arginine. Other suitable protein supplements include, for example, α-keratin, collagen, fibroin, sclerolin, myosin, actin, carboxypeptidase, typsin, ovalbumin, casein, and the like.

A scoopable dough of the invention preferably includes, for example, a dairy protein, an egg protein, or a wheat protein. Examples of suitable dairy proteins include whey, soy protein, caseinate, buttermilk, buttermilk solids, and nonfat dry milk. Examples of suitable egg proteins include albumin. Examples of suitable wheat proteins include those derived from flour or gluten. A scoopable dough of the invention preferably includes caseinate, albumin, whey protein concentrate, nonfat dry milk, buttermilk, or a combination thereof. In one embodiment, the scoopable dough of the invention includes a protein supplement having a combination of albumin and caseinate. In another embodiment, the scoopable dough of the invention includes a protein supplement having a combination of wheat protein and caseinate.

The scoopable dough of the invention includes a protein supplement in an amount effective to provide a baked product having a crisp exterior and a moist but nondoughy interior. The amount of protein supplement should not exceed an amount that would provide a tough, crumbly baked product. Yet the amount of protein supplement should not be so low that a scoopable dough provides a baked product having a gummy, doughy texture. A scoopable dough of the invention typically includes a protein supplement in a range of between about 0.5 weight percent and about 4 weight percent, preferably between about 0.75 weight percent and about 3.5 weight percent, and more preferably between about 1.0 weight percent and about 3 weight percent.

In one embodiment, a scoopable dough of the invention includes a protein supplement having a combination of albumin and caseinate. Albumin can be present in an amount of between about 0.3 weight percent and about 1 weight percent, preferably between about 0.4 weight percent and about 0.9 weight percent, and more preferably between about 0.5 weight percent and about 0.8 weight percent. And caseinate can be present in an amount of between about 0.3 weight percent and 1 weight percent, preferably between about 0.4 weight percent and 0.9 weight percent, and more preferably between about 0.5 weight percent and about 0.8 weight percent.

A scoopable dough of the invention also includes a shortening. Shortening contributes to a baked product having desirabe palatability, physical texture, physical form, and overall aesthetic appeal. The shortening generally provides a baked product with a tender, soft, fluffy mouthfeel; a light, flaky texture; and crisp outer crust with a glossy appearance. Shortening can also contribute to the volume and grain of a baked product.

Shortening can be natural, for example, animal or vegetable shortening, or synthetic. Shortening generally includes fats and fatty oils, which are made of predominantly triesters of glycerol with fatty acids, commonly called triglycerides. The number of triglycerides in a given natural fat is a function of the number of fatty acids present and specificity of the enzyme systems involved in that particular fat-synthesis reaction.

Fats and fatty oils useful in producing shortening consistent with the invention include cottonseed oil, ground nut oil, soybean oil, sunflower oil, canola ("rape seed") oil, sesame oil, olive oil, corn oil, safflower oil, palm oil, palm kernel oil, coconut oil, and combinations thereof. One example of a shortening useful in a scoopable dough of the invention includes a shortening having soybean oil and cottonseed oil. This shortening can include soybean oil in an amount of between about 60 weight percent and about 95 weight percent, preferably between about 75 weight percent and about 85 weight percent, of total shortening and cottonseed oil in an amount of between about 5 weight percent and about 30 weight percent, preferably between about 15 weight percent and about 25 weight percent, of total shortening.

The scoopable dough of the invention can include any number of shortening compositions having a variety of physical states and/or physical forms. Suitable physical states of shortening include liquid, semisolid, and solid. Suitable physical forms of shortening include plasticized shortening, chip shortening, and noodle shortening.

A chip shortening can include chips in a concentration of about 30 weight percent to about 100 weight percent of total shortening. Preferably chip shortening includes chips in a concentration of about 66 weight percent to about 84 weight percent of total shortening. A chip can have an area of between about 40 mm$^2$ and about 370 mm$^2$, preferably between about 75 mm$^2$ and about 300 mm$^2$, and more preferably between about 75 mm$^2$ and about 180 mm$^2$. A chip can have a thickness of between about 0.08 cm and about 0.2 cm, preferably between about 0.125 cm and about 0.175 cm, and more preferably between about 0.14 cm and about 0.16 cm.

Although less preferred, a scoopable dough of the invention can include a noodle shortening. A noodle shortening can include a ribbon and/or a cylindrical noodle in a concentration of between about 10 weight percent and about 100 weight percent of total shortening, preferably between about 10 weight percent and about 30 weight percent of total shortening. A noodle can have a diameter of between about ⅛ and about ⅜ inch, preferably about ¼ inch. A noodle can have a length of about 1 inch or less, preferably about ¼ inch to about ½+L inch.

A noodle can be used to moderate the attributes provided by a chip to the baked product. If the noodles are cooled and handled properly they may even be used to emulate the properties provided by chip shortening. For example, hardened plastic shortening may be extruded through a pipe using a Graco pump having a die that forms shortening noodles of a specific diameter. A hardened shortening is more likely provided when the process undergoes less shear.

A shortening suitable for use with a scoopable dough of the invention generally has a high solid-to-fat index (SFI). This index measures the ratio of solid to fat over a range of temperatures. The greater this ratio, the greater the amount of solid present, which can provide flaky texture and a crisp outer crust. The shortening generally has a melting point of no greater than about 104° F. and preferably no greater than 102° F. The SFI profile typically provides a slope of about −0.9 or greater, preferably −0.95 or greater, and more preferably about −0.975 or greater.

The amount of shortening in a scoopable dough of the invention is effective to provide a baked product having a tender, soft, fluffy mouthfeel; a light, flaky texture; and a crisp outer crust. The amount of shortening should not exceed an amount that would provide a baked product having a gummy texture. Yet the amount of shortening should not be so low that a scoopable dough of the invention provides a baked product having a tough, dry, crumbly texture. The amount of shortening typically is in a range of between about 5 weight percent and about 28 weight percent, preferably between about 6 weight percent and about 20 weight percent, and more preferably between about 7.5 weight percent and about 15 weight percent.

A scoopable dough of the invention further includes a humectant. A humectant suitable for use in a scoopable dough of the invention contributes to obtaining a desirable water activity (Aw). A desirable water activity refers to an amount of water activity that produces desirable antimicrobial stability, which allows for a suitable shelf life for a scoopable dough of the invention. Although this invention is not limited to any particular theory, it is believed that the humectant facilitates storage stability without requiring a scoopable dough of the invention to be packaged by deoxygenating and/or hermetically sealing the package. (i.e., packaging under a vacuum).

A suitable shelf life includes storage at temperatures of less than about 30° F. (−1° C.), preferably less than about 10° F. (−12° C.), and more preferably less than about −10° F. (−23° C.) for a time period of about two months, preferably about four months, and more preferably about nine months. After thawing, a suitable shelf life also includes storage at temperatures of between about 30° F. (−1° C.) and about 50° F. (10° C.), preferably between about 35° F. (1° C.) and about 45° F. (7° C.), and more preferably between about 38° F. (3° C.) and about 42° F. (5° C.) for a time period of between about one and about seven days, preferably about two days, more preferably about three days, and even more preferably about four days.

A humectant suitable for use in a scoopable dough of the invention includes sugar and/or nonsugar ingredients that can bind moisture in a scoopable dough of the invention and a baked product made therefrom. Suitable humectant sugars include, for example, fructose, dextrose, corn syrup, corn-syrup solids, invert syrup, high fructose corn syrup, honey, molasses, maltose, sorbose, mannose, lactose, galactose, sucrose, and the like.

Suitable nonsugar humectants include, for example, glycerin, glycerol, sorbitol, mannitol, maltitol, xylitol, propylene glycol, hydrogenated glucose sugar, sugar ester, dextrin, and combinations thereof. In one embodiment, a scoopable dough of the invention includes a humectant having a combination of glycerin, propylene glycol, corn-syrup solids, and sucrose.

The amount of humectant in a scoopable dough of the invention is effective to provide a Aw of less than about 0.97, preferably less than about 0.95, and more preferably less than about 0.90. The amount of humectant should not exceed an amount that would render a dough of the invention nonscoopable. Yet the amount of humectant should not be so low that a scoopable dough of the invention loses antimicrobial stability. The amount of the humectant can be in a range of between about 2 weight percent and about 15 weight percent, preferably between about 4 weight percent and 12 weight percent, and more preferably between about 6 weight percent and about 10 weight percent.

In one embodiment, a scoopable dough of the invention includes a humectant having a combination of glycerin, propylene glycol, corn syrup solids, and sucrose. Glycerin can be present in an amount of between about 0.4 weight percent and about 1.0 weight percent, preferably between about 0.5 weight percent and about 0.8 weight percent, and more preferably between about 0.6 weight percent and about 0.7 weight percent. Propylene glycol can be present in an amount of between about 0.3 weight percent and about 0.9 weight percent, preferably between about 0.45 weight percent and about 0.55 weight percent. Corn syrup solids can be present in an amount of between about 2 weight percent and about 5 weight percent, preferably between about 3 weight percent and about 4 weight percent, and more preferably between about 3.25 weight percent and about 3.75 weight percent. And sucrose can be present in an amount of between about 0.5 weight percent and about 12 weight percent, preferably between about 1 weight percent and about 11 weight percent, and more preferably between about 2 weight percent and about 10 weight percent.

A scoopable dough of the invention also includes a leavening system to increase the volume and alter the texture of a baked product prepared by a scoopable dough of the invention. A leavening system typically includes a leavening agent and a complementary leavening agent. A leavening system typically includes an acidic leavening agent and a basic leavening agent. The reaction between the acidic and basic leavening agents triggers a release of carbon dioxide upon contact with moisture. The carbon dioxide gas aerates a dough during mixing and baking to provide a light, porous cell structure, fine grain, and a texture with desirable appearance and palatability.

Basic leavening agents suitable for use in a scoopable dough of the invention include, for example, sodium bicarbonate, and the like. Typically sodium bicarbonate is the selected basic leavening agent because it is stable and relatively inexpensive to produce.

Acidic leavening agents suitable for use in a scoopable dough of the invention include, for example, sodium or calcium salts or ortho, pyro, and complex phosphoric acids in which at least two active hydrogen ions are attached to the molecule. Baking acids include monocalcium phosphate monohydrate (MCP), monocalcium phosphate anhydrous (AMCP), sodium acid pyrophosphate (SAPP), sodium aluminum phosphate (SALP), dicalcium phosphate dihydrate (DPD), dicalcium phosphate (DCP), sodium aluminum sulfate (SAS), glucono-deltalactone (GDL), potassium hydrogen tartrate (cream of tartar), and the like. In one embodiment, the acidic leavening agent includes sodium aluminum phosphate.

At least a portion of the leavening system is encapsulated, i.e., either the leavening base or the leavening acid. By encapsulating at least a portion of the leavening system, the chemical reaction between the acidic and basic leavening agents can be delayed, thereby allowing for a shelf life at temperatures of between about 30° F. (−1° C.) and about 50° F. (10° C.) of up to about seven days. The term "at least a portion" includes between about 10 weight percent and about 100 weight percent, preferably between about 25 weight percent and about 75 weight percent, and more preferably between about 40 weight percent and about 60 weight percent of the leavening system. The granulation of the encapsulated leavening agent can affect the effectiveness of the leavening system.

Preferably the basic leavening agent is encapsulated. And preferably the entire basic leavening agent is encapsulated. In one embodiment, the encapsulated leavening agent includes encapsulated sodium bicarbonate. One type of encapsulated sodium bicarbonate useful for a scoopable dough of the invention includes BAKESHURE® 180 (Balchem, State Hill, N.Y.), which has a fine granulation (particle size is 2% maximum based on #60 mesh screen). BAKESHURE® 180 has 49% sodium bicarbonate coated with partially hydrogenated vegetable oil. Another less preferred type of encapsulated soda is CAP-SHUR® BC-140-70 (Balchem, State Hill, N.Y.), which contains sodium bicarbonate coated with hydrogenated cottonseed oil.

The evolution of carbon dioxide essentially follows the stoichiometry of typical acid-base reaction. The amount of basic leavening agent present determines the amount of carbon dioxide evolved, whereas the type of acidic leavening agent affects the speed at which the carbon dioxide is liberated. The amount of basic leavening agent used in combination with the acidic leavening agent should be balanced such that a minimum of unchanged reactants remain in the finished product. An excess amount of leavening base can impart a bitter flavor to the baked product while excess leavening acid can make the baked product tart.

The amount of a leavening system is effective to leaven a baked product prepared from a scoopable dough of the invention. The amount of a leavening system is typically present in an amount of between about 1 weight percent and about 5 weight percent, preferably between about 1.25 weight percent and 3 weight percent, and more preferably between about 1.5 weight percent and about 2.5 weight percent. Typically an acidic leavening agent is present in an amount of between about 0.5 weight percent and about 2.5 weight percent, preferably between about 0.65 weight percent and about 1.5 weight percent, and more preferably between about 0.75 weight percent and about 1.25 weight percent. Typically a basic leavening agent is present in an amount of between about 0.5 weight percent and about 2.5 weight percent, preferably between about 0.65 weight percent and about 1.5 weight percent, and more preferably between about 0.75 weight percent and about 1.25 weight percent.

The dough of the invention can include additives, for example, texture-modifying agents, emulsifiers, hydrocolloids, dough-developing agents, nutritional supplements, flavorings, shelf-life stabilizers, organic acids, binders of metal ions, and the like. Additives can modify texture or any number of characteristics of a scoopable dough of the invention or a baked product resulting therefrom.

A texture-modifying agent can improve viscoelastic properties, plasticity, dough development, and the like. Examples of suitable texture modifying agents include fats, emulsifiers, hydrocolloids, and the like.

An emulsifier can influence the texture and homogeneity of the dough mixture, increase dough stability, and improve the eating quality of a baked product. An emulsifier includes nonionic surfactants, anionic surfactants, and cationic surfactants. Suitable emulsifiers include, for example, lecithin, monoglycerides and diglycerides of fatty acids, propylene glycol monoesters and diesters of fatty acids, glyceryl-lacto esters of fatty acids, ethoxylated monoglycerides and diglycerides, and the like.

A hydrocolloid can increase moisture content and improve viscoelastic properties of a scoopable dough of the invention and crumb texture of the baked product by, for example, stabilizing small air cells within the dough and binding to moisture. Hydrocolloids include xanthan gum, guar gum, locust bean gum, and the like.

A dough-developing agent can enhance the viscosity, texture, and plasticity of a scoopable dough of the invention. Any number of dough-developing agents can be used including, for example, azodicarbonamide, diacetyl tartaric acid ester of monoglycerides and diglycerides, potassium sorbate, and the like.

A nutritional supplement such as, for example, vitamins, minerals, proteins, and the like can be added to a scoopable dough of the invention, examples of nutritional supplements include thiamin, riboflavin, niacin, iron, calcium, and the like.

Flavorings such as, for example, sweeteners, spices, and specific flavorings (e.g., butter flavoring) can be added to a scoopable dough of the invention. Sweeteners include, for example, regular and high fructose corn syrup, sucrose (cane or beet sugar), dextrose, and the like.

Particulates such as, for example, cranberry, chocolate, strawberry, raspberry, apricot, blueberry, cheese pieces/bits can be added to a scoopable dough of the invention.

Shelf-life stabilizers such as, for example, preservatives and mold inhibitors can be added to a scoopable dough of the invention. Suitable shelf-life stabilizers include, for example, sodium salts of propionic or sorbic acids, sodium diacetate, vinegar, monocalcium phosphate, lactic acid, and the like.

A scoopable dough of the invention can also include an organic acid. An organic acid can be effective against a scoopable dough of the invention losing its natural color and beginning to darken (known as dough graying). Examples of suitable organic acids include citric acid, ascorbic acid, malic acid, tartaric acid, oxalic acid, and the like. An organic acid can be included in an amount effective to provide a pH in a range of between about 5 and about 8.5, preferably between about 7.25 and about 8.25, and more preferably between about 7.5 and about 8. Less organic acid can be added when a scoopable dough of the invention includes flour having flour enrichments with reduced iron. This is preferred because excess organic acid can adversely impact flavor and texture.

A scoopable dough of the invention can also include a binder of metal ions. Some metal ions can help catalyze enzymatic reactions that can result in dough graying. Thus, a binder of metal ions can be effective against a scoopable dough of the invention losing its natural color. Examples of binders of metal ions include metal chelators and organic acids. A metal chelator can include, for example, ethylene diaminetetraacetate (EDTA). An organic acid can include an organic acid as described above.

Table 1 illustrates the useful, preferred, and more preferred ranges of the flour, protein supplement, shortening, humectant, and leavening system included in a scoopable dough of the invention.

TABLE 1

Ingredients in a Scoopable Dough of the Invention

| INGREDIENT | WEIGHT PERCENT | | |
|---|---|---|---|
| | USEFUL | PREFERRED | MORE PREFERRED |
| Flour | 30–51 | 33 to 48 | 36 to 45 |
| Protein Supplement | 0.5 to 4 | 0.75 to 3.5 | 1 to 3 |
| Shortening | 5 to 28 | 6 to 20 | 7.5 to 15 |
| Humectant | 2 to 15 | 4 to 12 | 6 to 10 |
| Leavening system | 1 to 5 | 1.25 to 3 | 1.5 to 2.5 |
| Acidic Leavening Agent | 0.5 to 2.5 | 0.65 to 1.5 | 0.75 to 1.25 |
| Basic Leavening Agent | 0.5 to 2.5 | 0.65 to 1.5 | 0.75 to 1.25 |

A scoopable dough of the invention can be free of emulsifiers and individually free of any of the respective additional ingredients such as a hydrocolloid, a dough-developing agent, a nutritional supplement, a shelf-life stabilizer, an organic acid, or a binder of metal ions.

A scoopable dough of the invention can be stored in a can, a bucket, a pail, a pouch, a sleeve, a cardboard box with plastic liner, and the like. Preferably the scoopable dough of the invention is stored in foodservice quantities in single-serve frozen units in a cardboard container containing up to about 150 or more single-serve frozen units.

One advantage of a scoopable dough of the invention includes its ability to be re-stored at freezer and refrigeration temperatures after the dough container has been opened and the dough has been used to prepare a baked product but some dough still remains. The leftover dough can be re-stored and used at a later time.

Another advantage of a scoopable dough of the invention is that the scoopable dough need not be packaged under a vacuum.

A scoopable dough of the invention can generally be prepared by mixing the above-described ingredients to form a dough, forming a quantity of dough into suitable shaped and sized portions such as by transferring the dough to a depositor, extruding through a die, wire cutting into single-serve units onto a sheet of plastic film, freezing the shaped and sized portions to form frozen pieces, and packaging quantities of the frozen pieces for foodservice or consumer product quantities, and shipping under frozen conditions. To prepare a scoopable dough of the invention, the dough is processed so that it is underdeveloped. That is, the dough is processed or worked so that it has a structure suitable for holding its shape but not developed enough to have a developed bread-dough structure.

To process an underdeveloped dough, the dough is generally subjected to low shear and low work input during the mixing of the dough and the depositing of the dough. The term "low shear" refers to keeping the force applied to the dough in the lateral direction low enough to process an underdeveloped dough. And the term "low work input" refers to keeping the level of power times time low enough to process an underdeveloped dough. Low shear and low work input can be achieved by, for example, keeping the mixing time short enough to provide adequate ingredient integration, using a wide thread auger, eliminating excessive pumping in the depositor system, and the like.

A scoopable dough of the invention can be prepared by using one-stage mixing to combine the ingredients. One-stage mixing refers to the sequence in which the ingredients are combined. For a scoopable dough of the invention, all dry ingredients such as, for example, shortening, etc., are blended prior to adding the liquid ingredients such as, for example, water, butter flavor, propylene glycol, glycerin, etc. The dry ingredients and liquid ingredients are mixed until the ingredients are substantially uniformly integrated. This mixing sequence is effective to prevent the flour from hydrating and resulting in an overdeveloped dough.

A scoopable dough of the invention can be mixed in any mixer suitable for combining the ingredients in a manner with low shear and low work input. An example of a suitable mixer includes a Horizontal Bar mixer (champion, Joliet, Ill.). During mixing, the scoopable dough of the invention is desirably maintained at a temperature that reduces the likelihood that the leavening system will react, maintains the structure of the shortening, and facilitates freezing of the dough. Typically the temperature should be in a range of between about 45° F. (7° C.) and about 70° F. (21° C.), preferably between about 50° F. (10° C.) and about 65° F. (18° C.), and more preferably between about 56° F. (13° C.) and about 62° F. (16° C.).

Preferably the mixer is equipped with a refrigeration system such as, for example, a jacketed glycol coolant, to maintain the scoopable dough of the invention within the desirable temperature range.

To maintain the desirable temperature, water added to the dry ingredients should be at a temperature suitable for maintaining the dough at the desirable temperature. Preferably the water is at a temperature of between about 33° F. (1° C.) and 36° F. (2° C.). To bring the water to a temperature suitable for maintaining the dough at the desirable temperature, a portion of the water can be replaced by shaved or crushed ice. The amount and size of the shaved or crushed ice can be determined so that the ice can melt in the water and/or dough during mixing without leaving ice in the mixed and/or deposited dough. If ice remains in the mixed and/or deposited dough, wet spots will appear in the dough, which is undesirable. The size of the shaved or crushed ice can typically be up to about ¼ inch. The portion of water that is replaced by shaved ice can be up to about 20 weight percent of total water.

The scoopable dough of the invention is mixed at a speed and time that are suitable for maintaining low shear and low work input. For example, when the dry ingredients are blended in a Horizontal Bar mixer, the ingredients can be mixed at a speed in a range of between, for example, about 32 and about 40 rpm. This blending can occur over a time of between, for example, about 28 seconds and about 60 seconds.

When the liquid ingredients are added to the blended dry ingredients in a Horizontal Bar mixer, the ingredients can be mixed, for example, for about 1.5 minutes to about 2 minutes at a speed of, for example, between about 32 rpm and 40 rpm. The speed can then be increased to between, for example, about 64 rpm and about 80 rpm for about 1.5 minutes to about 2 minutes. These times and speeds are merely illustrative and can vary depending on the amount of scoopable dough being mixed.

After mixing, a scoopable dough of the invention desirably has a temperature of between about 45° F. (7° C.) and about 70° F. (21° C.), preferably between about 50° F. (10° C.) and about 65° F. (18° C.), and more preferably between about 56° F. (13° C.) and about 62° F. (16° C.). Also after mixing, a scoopable dough of the invention typically has desirable viscoelastic properties, for example, desirable dough consistency or desirable torque profile. More particularly, a scoopable dough of the invention typically has a dough consistency ranging from between about 300 B.U. and about 1,200 B.U., preferably between about 400 B.U. and about 1,000 B.U., and more preferably between about 500 B.U. and about 800 B.U. according to a Farinograph measurement. A Farinograph measurement measures a dough's resistance to mixing. To take a Farinograph measurement, a 480 gram sample of the invention can be placed in a jacketed bowl, controlled at a temperature of 60° F. (15° C.), equipped with a sigma blade (C.W. Brabender Instruments, Inc. South Hackensack, N.J.). The sample can then be placed in a Farinograph (C.W. Brabender Instruments, Inc. South Hackensack, N.J.) and measurements can be taken for a time period effective for determining a peak amplitude. The Farinograph can be operated according to the manufacturer's instructions. A peak amplitude can be identified and recorded.

Similarly, a scoopable dough of the invention can have a torque profile in a range of about 0.3 N·cm and up to greater than about 3 N·cm, preferably between about 0.6 N·cm and about 2.8 N·cm, and more preferably between about 0.9 N·cm and about 2.5 N·cm according to a Haake measurement. A Haake measurement can be determined using a Haake VT550 viscometer (Haake Co., Paramus, N.J.) with a transducer head of 3 N·cm. The vicsometer can produce a torque profile by carrying out a vane test with a four-bladed vane rotated at a constant rate over a period of time. To carry out a test, a 400 gram sample can be placed in a container, and the sample and container can be equilibrated to about 60° F.+/−2° F. (15° C.+/−2° C.). The container can then be placed in a viscometer and centered underneath a 20 mm by 20 mm vane. The vane can be lowered into the sample until it is at least halfway submerged. The viscometer can then be zeroed, and the measurement can be initiated and run for a period of about 300 seconds. The maximum value on a torque-time curve can be recorded.

After the scoopable dough of the invention is mixed, it can be transferred to a depositor or dough trough and thereafter can be extruded through a die. For example, a dough of the invention can be placed into the hopper of a Vemag Extruder (Robert Reiser and company, Inc., Canton, Mass.), which extrudes the dough. An extrusion die plate can be attached to the extruder. The extrusion die plate can have extrusion hole diameters of at least ½ inch, preferably at least 1 inch, and most preferably at least 1½ inches. A standard die can have extrusion holes in a configuration of three sets of holes by six holes across or a variety of other configurations. The die holes are generally circular but can be provided in a variety of shapes including triangular, heart-shaped, oval, square, etc.

Thereafter the dough extruded can be cut via a wire into a individual single-serve units and dropped onto a sheet of film on a conveyor. The individual single-serve units range in size from about 0.5 ounces to about 8 ounces, preferably from about 2 ounces to about 6 ounces, and most preferably from about 3.5 ounces to about 5.5 ounces. The dough on a sheet of film can then be conveyed into and through a freezer. The freezer set temperature and dwell time can be set to achieve a maximum exit temperature of about 0° F. (−17° C.) to about 15° F. (−9° C.), preferably about 10° F. (−12° C.). A scoopable dough of the invention can be frozen at a temperature of between about −10° F. (−23° C.) and about −15° F. (−9° C.). A scoopable dough of the invention is preferably frozen as quickly and completely as possible.

Thereafter, the dough can be packaged in foodservice quantities of at least 150 individual single-serve units per container. For example, the frozen individual single-serve units can be placed in a lined cardboard container in a configuration of six layers of the units with thirty individual units per layer.

An individual single-serve unit of the invention can be transferred to any suitable container.

During depositing and after being deposited into a container; the container need not be deoxygenated and/or hermetically sealed (i.e., packaged under a vacuum).

The foodservice quantity of individual frozen single-serve units of scoopable dough can then be placed in a finish/storage freezer until transported to a foodservice customer. A foodservice operator can then place the individual single-serve units of scoopable dough on a baking sheet in an oven without an intermediate thawing or proofing step, and baked to obtain a desirably consumable product having a Baked Specific Volume (BSV) of at least 2.0 cc/g.

This invention will be further characterized by the following example. The example is not meant to limit the scope of the invention, which has been fully set forth in the foregoing description. Variations within the scope of the invention will be apparent to those skilled in the art.

The following example depicts a nonlimiting illustration of the various attributes of the invention when prepared.

To prepare a scoopable dough of the invention, one-stage mixing in a Horizontal Bar mixer equipped with a jacketed glycol coolant combines the ingredients. For each scoopable dough formulation, all of the dry ingredients (flour, hydrogenated vegetable shortening, shortening chips and/or pellets, sugar, SALP, citric acid, salt, corn-syrup solids, albumin, caseinate, buttermilk solids, dextrose, encapsulated soda, cheese powder, and cheese pieces) were blended at a speed of between about 32 rpm and about 40 rpm for about 30 seconds.

The liquid ingredients (water, butter flavor, propylene glycol, glycerin, and yellow no. 5) were then added. The added water, which contained shaved ice in an amount of about 10 weight percent of total water, was at a temperature of between about 33° F. (1° C.) and about 36° F. (2° C.). The liquid and dry ingredients were then mixed from about 1.5 to about 2 minutes at a speed of between about 32 rpm and 40 rpm. The speed was then increased to between about 64 rpm and about 80 rpm for about 1.5 minutes.

After mixing, the scoopable dough of the invention was at a temperature of between about 56° F. (13° C.) and about 62° F. (16° C.).

The scoopable dough of the invention was transferred to the hopper of a Vemag extruder, which vertically extruded the dough through a die into 4.5 ounce individual single-serve units onto a film sheet on a conveyor.

The scoopable dough of the invention was then frozen at a temperature of between about −10° F. (−23° C.) and about −15° F. (−26° C.) and the final temperature of the scoopable dough was about 10° F. (−12° C.).

The 4.5 ounce individual single-serve units of dough were then packaged in foodservice quantities of at least 150 individual single-serve units per container and shipped to a foodservice customer.

Thereafter the foodservice customer placed the single-serve units on a baking sheet and placed it in an oven without an intermediate proofing or thawing step.

The ingredients of four illustrative types of drop biscuits are shown in Table 2.

TABLE 2

Examples of Drop Biscuits Prepared From A Scoopable Dough of the Invention

| | Weight Percent | | | |
|---|---|---|---|---|
| Ingredients | General Biscuit | Southern Style | Cheese | Sweet |
| Hard Wheat Flour | 9.40 | 9.44 | 8.11 | 10.5 |
| Soft Wheat Flour | 33.77 | 33.73 | 29.22 | 33.26 |
| Hydrogenated Vegetable Shortening | 2.43 | 2.43 | 2.12 | 1.65 |
| Shortening Chips | 9.7 | 12.12 | 10.58 | 6 |
| Shortening Pellets | 2.42 | — | — | — |
| Sugar | 2.0 | 2.00 | 2.00 | 10.00 |
| SALP | 1.08 | 1.08 | 1.08 | 1.08 |
| Citric Acid | 0.08 | 0.08 | 0.08 | 0.08 |
| Salt | 1.01 | 1.01 | 1.51 | 1.01 |
| Corn-Syrup Solids | 3.62 | 3.62 | 3.62 | 3.62 |
| Albumin | 0.60 | 0.60 | 0.60 | 0.60 |
| Caseinate | 0.71 | 0.71 | 0.71 | 0.71 |
| Buttermilk Solids | 2.03 | 2.03 | 2.03 | 2.03 |
| Dextrose | 0.13 | 0.13 | 0.13 | 0.13 |
| Encapsulated Soda (50%) | 2.16 | 2.16 | 2.16 | 2.16 |
| Glycerin | 0.64 | 0.64 | 0.64 | 0.64 |
| Propylene Glycol | 0.49 | 0.49 | 0.49 | 0.49 |
| Butter Flavor | 0.03 | 0.03 | 0.03 | 0.03 |
| Water | 27.7 | 27.7 | 27.7 | 27.7 |
| Cheese Powder | | | 1.17 | |
| Cheese Pieces | | | 9.72 | |
| Yellow No. 5 | | | | 0.02 |
| Total | 100.00 | 100.00 | 100.00 | 100.00 |

The ingredients for the formulations were provided as follows: Hydrogenated Vegetable Shortening (Vegetable Shortening; AC Humko Corp.; Memphis, Tenn.); Shortening Chips (Hydrogenated Shortening Chips; Gloden Foods; Louisville, Ky.); Shortening Pellets (Mini Chuck Shortening F327X; Bunge Foods, Bradely, Ill.); Sugar (Crystal Sugar Standard Granulation; United Sugars Corp.; Minneapolis, Minn.); SALP (Levn-Lite; Solutia INC. (Monsanto); St. Louis, Mo.); Citric Acid (#1 14–830 Citric Acid; ADM; North Kansas City, Mo.); Salt (Culinox 999, Food Grade Salt; Morton International; Chicago, Ill.); CSS (Maltrin M200 Corn Syrup Solids; Grain Processing Corp.; Muscatin, Iowa); Albumin (Dried Egg Whites; Primera Foods; Cameron, Wis.): Caseinate (Ecco 2300 Sodium Caseinate; Erie Foods International; Erie, Ill.); Buttermilk (Dry Sweet Cream Buttermilk; Dairy America, Inc.; Dublin, Calif.); Dextrose (CLINTROSE Dextrose Monohydrate; ADM Corn Sweeteners, Decatur, Ill.); Encapsulated Soda 50% (Bakeshure.RTM 180; Balchem Corp.; Slate Hill, N.Y.); Glycerin (Superol Glycerin (99.7%); Procter and Gamble Company; Cincinnati, Ohio); Propylene glycol (Propylene glycol, U.S.P.; Harris and Ford; Indianapolis, Ind.); Butter Flavor (Natural Butter WONF# 12331; SKW Biosystems Inc.; Waukesha, Wis.); Yellow 5/Red 40 #993809499; CHR Hansen-ITC; Cincinnati, Ohio); Hard Wheat Flour (Wheat Flour; ADM; North Kansas City, Mo.); Soft Wheat Flour (American Beauty High Ratio cake Flour; ConAgra; Omaha, Nebr.); Cheese-Flavored Pieces (Cheese-Flavored Pieces; Shade Foods; New Century, Kans.); and N&A Cheese Flavor (N&A Cheese Flavor; Givuadan Roure; Cincinnati, Ohio).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of use for a dough, comprising,
   a. preparing a scoopable dough comprising:
      (i) flour, the flour being present in an amount effective for providing structure to the dough;
      (ii) a protein supplement, the protein supplement being present in an amount effective for providing structure to the dough;
      (iii) a shortening, the shortening body being present in an amount effective for providing desirable physical texture to the dough;
      (iv) a humectant, the humectant being present in an amount effective for providing an $A_w$ of less than about 0.97;
      (v) a leavening system comprising a leavening agent and a complementary leavening agent, the leavening system having between about 10 weight percent and about 100 weight percent of the leavening agent, the complementary leavening agent, or a mixture thereof encapsulated, and the leavening system being present in an amount effective for leavening a baked product prepared from the dough; and
      (vi) water, the water being present in an amount effective for providing a flour-to-water ratio in a range of between about 2:1 and about 1:1;
   b. forming the dough into shaped and sized portions;
   c. freezing the shaped and sized portions to form frozen shaped dough pieces;
   d. placing at least one frozen dough piece in an oven without an intermediate thawing or proofing step; and,
   e. baking the frozen dough pieces to form a leavened baked good having a BSV of at least about 2.0 cc/g.

2. The method of claim 1, wherein the dough is shelf stable after storage without storage under a vacuum for between about 2 months and about 9 months at freezing temperatures and shelf stable after thawing without storage under a vacuum for between about 1 day and about 7 days at refrigeration temperatures.

3. The method of claim 1, wherein the dough exhibits a dough consistency of between about 300 Brabender Units. and about 1,200 Brabender Units within 10 minutes of forming the dough.

4. The method of claim 1, wherein the dough exhibits a dough consistency of between about 600 Brabender Units and 1,200 Brabender Units within 10 minutes of forming the dough.

5. The method of claim 1, wherein the dough exhibits a torque profile of about 0.3 N·cm to greater than about 3 N·cm within 10 minutes of mixing the dough.

6. The method of claim 1, wherein the dough is storage stable at ambient pressure.

7. The method of claim 1, wherein the dough comprises a blend of soft wheat flour and hard wheat flour in a ratio of soft wheat flour to hard wheat flour of between about 2.2:1 and about 4:1.

8. The method of claim 1, wherein the dough comprises a flour with low polyphenol oxidase activity.

9. The method of claim 1, wherein the dough comprises a flour enrichment having reduced iron.

10. The method of claim 1, wherein the dough comprises a flour in an amount of between about 30 weight percent and about 51 weight percent.

11. The method of claim 1, wherein the dough comprises a protein supplement in an amount between about 0.5 weight percent and about 4 weight percent.

12. The method of claim 10, wherein the protein supplement comprises albumin, caseinate, wheat protein, or mixtures thereof.

13. The method of claim 1, wherein the dough comprises a shortening in an amount of between about 5 weight percent and about 28 weight percent.

14. The method of claim 1, wherein the dough comprises a humectant in an amount effective for providing an Aw of less than about 0.95.

15. The method of claim 14, wherein the humectant comprises glycerin, propylene glycol, corn-syrup solids, sucrose, or mixtures thereof.

16. The method of claim 1, wherein the dough comprises a leavening system comprising baking soda, a complementary leavening agent, and encapsulated baking soda.

17. The method of claim 1, wherein the dough comprises a leavening system comprising a complementary leavening agent and encapsulated baking soda.

18. The method of claim 1, wherein 100 weight percent of the leavening system is encapsulated.

19. The method of claim 1, further comprising citric acid in an amount effective to provide the scoopable dough with a pH between about 7.25 and about 8.25.

20. The method of claim 1, wherein the dough further comprises a particulates.

21. The method of claim 20, wherein the particulates comprises cranberry, chocolate, strawberry, raspberry, apricot, blueberry, cheese bits, or mixtures thereof.

22. The method of claim 1, wherein the die hole of step B is the shape of a circle with a diameter of between about 1 inch and about 6 inches.

23. The method of claim 1, wherein the die hole of step B is in the shape of a triangle, square, star, rectangle, and oval.

24. The method of claim 1, wherein the individual single-serve size shapes are packaged in quantities of at least 150 individual single-serve units per package.

25. A method of use for a dough, comprising,
  a. preparing a scoopable dough comprising:
    (i) flour, the flour being present in an amount effective for providing structure to the dough;
    (ii) a protein supplement, the protein supplement being present in an amount effective for providing structure to the dough;
    (iii) a shortening, the shortening body being present in an amount effective for providing desirable physical texture to the dough;
    (iv) a humectant, the humectant being present in an amount effective for providing an $A_w$ of less than about 0.97;
    (v) a leavening system comprising a leavening agent and a complementary leavening agent, the leavening system having between about 10 weight percent and about 100 weight percent of the leavening agent, the complementary leavening agent, or a mixture thereof encapsulated, and the leavening system being present in an amount effective for leavening a baked product prepared from the dough; and
    (vi) water, the water being present in an amount effective for providing a flour-to-water ratio in a range of between about 2:1 and about 1:1;
  b. forming the dough into shaped and sized portions;
  c. freezing the shaped and sized portions to form frozen shaped dough pieces;
  d. thawing at least one frozen dough piece for at refrigeration temperatures;
  e. placing at least one thawed dough piece in an oven; and,
  f. baking the thawed dough pieces to form a leavened baked good having a BSV of at least about 2.0 cc/g.

26. The method of claim 25, wherein the dough is shelf stable after storage without storage under a vacuum for between about 2 months and about 9 months at freezing temperatures and shelf stable after thawing without storage under a vacuum for between about 1 day and about 7 days at refrigeration temperatures.

27. The method of claim 25, wherein the dough exhibits a dough consistency of between about 300 Brabender Units. and about 1,200 Brabender Units within 10 minutes of forming the dough.

28. The method of claim 25, wherein the dough exhibits a dough consistency of between about 600 Brabender Units and 1,200 Brabender Units within 10 minutes of forming the dough.

29. The method of claim 25, wherein the dough exhibits a torque profile of about 0.3 N·cm to greater than about 3 N·cm within 10 minutes of mixing the dough.

30. The method of claim 25, wherein the dough is storage stable at ambient pressure.

31. The method of claim 25, wherein the dough comprises a blend of soft wheat flour and hard wheat flour in a ratio of soft wheat flour to hard wheat flour of between about 2.2:1 and about 4:1.

32. The method of claim 25, wherein the dough comprises a flour with low polyphenol oxidase activity.

33. The method of claim 25, wherein the dough comprises a flour enrichment having reduced iron.

34. The method of claim 25, wherein the dough comprises a flour in an amount of between about 30 weight percent and about 51 weight percent.

35. The method of claim 25, wherein the dough comprises a protein supplement in an amount between about 0.5 weight percent and about 4 weight percent.

36. The method of claim 35, wherein the protein supplement comprises albumin, caseinate, wheat protein, or mixtures thereof.

37. The method of claim 25, wherein the dough comprises a shortening in an amount of between about 5 weight percent and about 28 weight percent.

38. The method of claim 25, wherein the dough comprises a humectant in an amount effective for providing an Aw of less than about 0.95.

39. The method of claim 38, wherein the humectant comprises glycerin, propylene glycol, corn-syrup solids, sucrose, or mixtures thereof.

40. The method of claim 25, wherein the dough comprises a leavening system comprising baking soda, a complementary leavening agent, and encapsulated baking soda.

41. The method of claim 25, wherein 100 weight percent of the leavening system is encapsulated.

42. The method of claim 25, further comprising citric acid in an amount effective to provide the scoopable dough with a pH between about 7.25 and about 8.25.

43. The method of claim 25, wherein the dough further comprises a particulates.

44. The method of claim 43, wherein the particulates comprises cranberry, chocolate, strawberry, raspberry, apricot, blueberry, cheese bits, or mixtures thereof.

45. The method of claim 25, wherein the die hole of step B is the shape of a circle with a diameter of between about 1 inch and about 6 inches.

46. The method of claim 25, wherein the die hole of step B is in the shape of a triangle, square, star, rectangle, and oval.

47. The method of claim 25, wherein the individual single-serve size shapes are packaged in quantities of at least 150 individual single-serve units per package.

* * * * *